United States Patent [19]

Ido et al.

[11] Patent Number: 5,697,558
[45] Date of Patent: Dec. 16, 1997

[54] WORKING NOZZLE FOR GEL COATING OF SEEDS

[75] Inventors: Yoichi Ido; Yasushi Kohno, both of Susono, Japan

[73] Assignee: Yazaki Corporation, Tokyo, Japan

[21] Appl. No.: 552,125

[22] Filed: Nov. 2, 1995

[30] Foreign Application Priority Data

Nov. 4, 1994 [JP] Japan ................... 6-271221

[51] Int. Cl.$^6$ ........................................ B05B 1/30
[52] U.S. Cl. .................. 239/584; 239/570; 118/23; 118/29
[58] Field of Search ........................ 239/583, 584, 239/570; 118/13, 23, 26, 29, 303, 400, 423; 427/4

[56] References Cited

U.S. PATENT DOCUMENTS

| | | | |
|---|---|---|---|
| 4,806,357 | 2/1989 | Garrett et al. | 427/4 |
| 4,808,430 | 2/1989 | Kouno | 427/4 |
| 5,080,925 | 1/1992 | Kouno | 427/4 |
| 5,107,787 | 4/1992 | Kouno | 118/23 |
| 5,254,358 | 10/1993 | Kouno et al. | 427/4 |
| 5,421,882 | 6/1995 | Kouno et al. | 118/23 |
| 5,509,963 | 4/1996 | Kohno | 118/23 |
| 5,512,101 | 4/1996 | Kohno | 118/23 X |

FOREIGN PATENT DOCUMENTS 5-7014  2/1993  Japan.

*Primary Examiner*—Andres Kashnikow
*Assistant Examiner*—Lisa Ann Douglas
*Attorney, Agent, or Firm*—Nikaido Marmelstein Murray & Oram LLP

[57] ABSTRACT

In a working nozzle for a gel coating apparatus, a nozzle plunger (15) has, in addition to a valve portion (15b), located at its lower end, for opening or shutting the small-diameter portion of a plunger insertion hole (4), a flange (16) which is located above the valve portion and can be brought into contact with or separated from an edge of the small-diameter hole portion (5). This prevents leakage of gel during shutting of the small diameter. The nozzle plunger has also a gel accommodating groove (17) provided on the outer periphery of said valve portion and adjoining to a lower surface of the flange, thereby permitting the sharp cutting of the gel when the valve shuts. The nozzle plunger has a step (25) provided at the lower end of its inner periphery and having a larger diameter than larger than the inner diameter of the valve portion, thus preventing stagnancy of seeds within the nozzle plunger.

3 Claims, 6 Drawing Sheets

1

WORKING NOZZLE FOR GEL COATING OF SEEDS

BACKGROUND OF THE INVENTION

1. Field of the Invention

The present invention relates to an improvement of the working nozzle in a gel coating device for making a gel film by valve opening/shutting by a nozzle plunger of a working nozzle.

2. Description of the Prior Art

An example of the previously known arts of the working nozzle in a gel coating device for seeds is disclosed in Japanese UM Preliminary Publn No. 5-7014.

A working nozzle A is shown in a longitudinal sectional view of FIG. 5 and a partially exploded front view of FIG. 6. As seen from these figures, a gel chamber 2 for accommodating gel is provided within a valve case 1. To an opening 3 provided below the gel chamber 2, a gel supply tube communicating with a gel tank is connected. Inside the opening 3, a stopper valve composed of a spring 19 and a steel ball 20 urged by the spring 19 so as to be brought into contact with the opening 3 is constituted. The gel chamber 2 is filled with gel.

As shown in FIG. 6, an insertion hole 21 opened from the gel chamber 2 to the exterior of the valve case 1 is provided, and a pressurizing plunger 22 is inserted in the insertion hole 21.

When the pressurizing plunger 22 is reciprocated for the gel chamber 2, the gel within the gel reservoir 2 is pressurized and decompressed.

In FIG. 5, to the left side of the valve case 1, a nozzle case 8 is attached through which a plunger insertion hole 4 penetrates. A small-diameter hole portion 5 is formed at the lower end of the plunger insertion hole 4.

The nozzle case 8 and valve case 1 constitute a valve body which is a body of the processing nozzle A.

The plunger insertion hole 4 includes an intermediate hole portion 4a and an upper hole portion 4b above the small-diameter hole portion 5 and a large-diameter hole portion 4d located above the upper hole portion 4b through a seal insertion step 4c.

The intermediate hole portion 4a and the gel chamber 2 are communicated with each other by a gel flow path 7 (FIG. 5). The outer periphery of a sleeve 8 is fit in the upper hole portion 4b. A cylindrical nozzle plunger 9 is inserted in the sleeve 8 so that it can rise and fall. At the seal insertion step 4c, the gap between the nozzle plunger 9 and the plunger insertion hole 4 is sealed with seal 10.

On the upper end surface of the nozzle case 8, a cylindrical portion 11 is provided, and on the outer surface of the cylindrical portion 11, a male screw 11a is screwed. A female screw 12a provided on a cover 12 for spring adjustment is mated with the male screw 11a.

A spring 14 is elastically provided between a spring receiver 13 placed on the nozzle plunger 9 and the cover 12 for spring adjustment.

Therefore, the spring 14 urges the nozzle plunger 9 downwards through the cover 12 for spring adjustment so that a valve portion 9b which is the lower end of the nozzle plunger 9 is inserted into the small-diameter hole portion 5, thereby shutting the small-diameter hole portion 5.

On the outer periphery of the nozzle plunger 9, a pressure receiving surface 9a is formed. For this reason, when the pressurizing plunger 22 intrudes towards the gel chamber 2 to pressurize the gel contained in the gel chamber 2 and the gel flow path 7, the nozzle plunger 9 whose pressure receiving surface 9a has been pressed by the gel rises against the spring 14. The valve portion 9b of the nozzle plunger 9 opens the small-diameter hole portion 5 so that the gel in the gel flow path 7 flows out below the small-diameter hole portion 5 through the gap between the intermediate hole portion 4a of the plunger insertion hole 4 and the nozzle plunger 9.

When the pressurizing plunger 22 retracts, the gel contained in the gel chamber 2 and the gel flow path 7 is decompressed. Then, the nozzle plunger 9 lowers to shut the valve. As a result, the flowedout gel is interrupted, and the gel not dropped but left forms a gel film applied to the periphery of the lower end of the plunger insertion hole 4 under the small-diameter hole portion 5.

On the other hand, decompressing the gel chamber 2 opens the stopper valve composed of the steel hall 20 and the spring 19. Then, the gel chamber 2 is supplied with gel.

Synchronously with this, a seed supply mechanism (not shown) arranged above the processing nozzle A drops a seed into the plunger insertion hole 4. The seek passes through the nozzle plunger 9 and is placed on the gel film formed under the small-diameter hole portion 5.

The gel film dangles gradually because of its own weight and encircles the seed and bubble. At this time, the valve opens again, and the gel flowed out covers the seed and bubble. Because of the gel newly flowed out, the gel film with the weight increased drops.

The dropping gel is sphered by surface tension, and the gel thus sphered drops into hardening agent contained in a hardening bath arranged at the lower position.

The left gel forms a gel film under the plunger insertion hole. The seed dropped in synchronism with this is placed on the gel film. The gel film containing a seed and bubble drops into the hardening bath by valve opening/shutting again. Thus, the gel coating/processing of seeds is successively executed.

The processing nozzle A of the gel coating/processing device of seeds has the following defects.

Whenever the nozzle plunger 9 rises or falls, the valve portion 9b slides within the small-diameter hole portion 5 of the plunger insertion hole 4 to open or shut the valve. While the processing nozzle A is continuously operated for a long time, the valve portion 9b and the small-diameter hole portion 5 wear because of sliding friction, thus increasing clearance.

Thus, even when the valve shuts, the gel leaks from the small-diameter hole portion 5. This makes the flowing-out/ stopping of the gel unstable. In addition, the gel leaks from a part of the small-diameter hole portion 5. As a result, as shown in FIG. 7, the gel G deflected in a certain direction when the valve opens is formed. This makes it impossible to sphere the gel G coating a seed.

Further, relatively small clearance between the valve 9b and the small-diameter hole portion 9b makes it non-smooth to operate the valve portion 9b. Inversely, large clearance therebetween causes the gel to flow out. Therefore, the clearance between the outer diameter of the valve portion 9b and the inner diameter of the small-diameter hole portion 5 must be strictly controlled.

Thus, generation of a working error slightly exceeding the clearance will make the operation of stopping the gel flow-out unstable.

When the valve opens as a result of rise of the nozzle plunger 9 and the gel flows out from between the outer peripheral surface of the valve portion 9b and the inner peripheral surface of the small-diameter hole portion 5 to form the gel film under the small-diameter hole portion 5, a small amount of the gel $G_1$ is applied to the end of the valve portion 9b.

While the working nozzle A is continuously operated for a long time, the applied gel $G_1$ may extend to the end of the inner periphery of the plunger 9 (FIG. 7).

On the other hand, the dropping paths of the seeds S supplied from the nozzle plunger 9 may vary. Specifically, the seeds dropping close to the inner periphery of the nozzle plunger 9 are applied to the gel $G_1$ extended to the lower end of the inner peripheral surface of the nozzle plunger 9 and stop there. Further, the seeds dropping later are further applied to the stopping seeds S (FIG. 8). Thus, the seeds will not be increasingly supplied to the gel film.

SUMMARY OF THE INVENTION

An object of the invention is to provide a working nozzle in which the flowing and stopping operation of gel is stabilized and seeds do not stop in the inner periphery of the nozzle plunger even when a working error slightly exceeding a size clearance between a valve portion and a small-diameter hole portion or sliding error is generated.

In order to attain the above object, in accordance with the present invention, there is provided a working nozzle for a gel coating apparatus comprising: a valve case including a gel chamber for accommodating gel; a nozzle case having a plunger insertion hole which penetrates vertically and has a small-diameter hole portion formed at a lower end; a cylindrical nozzle plunger to be inserted in the plunger insertion hole; a gel flow path communicating the gel chamber with the plunger insertion hole; and the nozzle plunger comprising a valve portion, located at its lower end, for opening or shutting the small-diameter hole portion, and a flange which is located above the valve portion and can be brought into contact with or separated from an edge of the small-diameter hole portion.

Preferably, the nozzle plunger has a relief groove provided on the outer periphery of the valve portion and adjoining to a lower surface of the flange, the relief groove serving to accommodate gel.

Preferably, the nozzle plunger has a step provided at the lower end of its inner periphery and having a larger diameter than the inner diameter of the valve portion.

The present invention has the following meritorious effects.

(1) On the upper end of the valve portion provided at the lower end of the nozzle plunger in the working nozzle, a flange covering the edge of the small-diameter hole portion is circumferentially provided. For this reason, even when sliding wear is generated between the valve portion of the nozzle plunger and the small-diameter hole portion, leakage of gel during valve shutting can be surely stopped.

(2) On the outer surface of the valve portion, a gel accommodating groove communicating with the lower surface of the flange is circumferentially provided. For this reason, delay of the valve shutting is removed, thereby permitting the gel to be sharply cut.

(3) In the prior art, a part of the gel flowed out because of the valve opening extends to the inner periphery of the nozzle plunger from the lower end thereof. Such a gel extended causes seeds to stagnate within the nozzle plunger. But, in accordance with the present invention, a step provided at lower end of the inner periphery of the nozzle plunger can solve this problem.

The above and other objects and features of the present invention will be more apparent from the following description taken in conjunction with the accompanying drawings.

DESCRIPTION OF THE PREFERRED EMBODIMENTS

Figure 1:
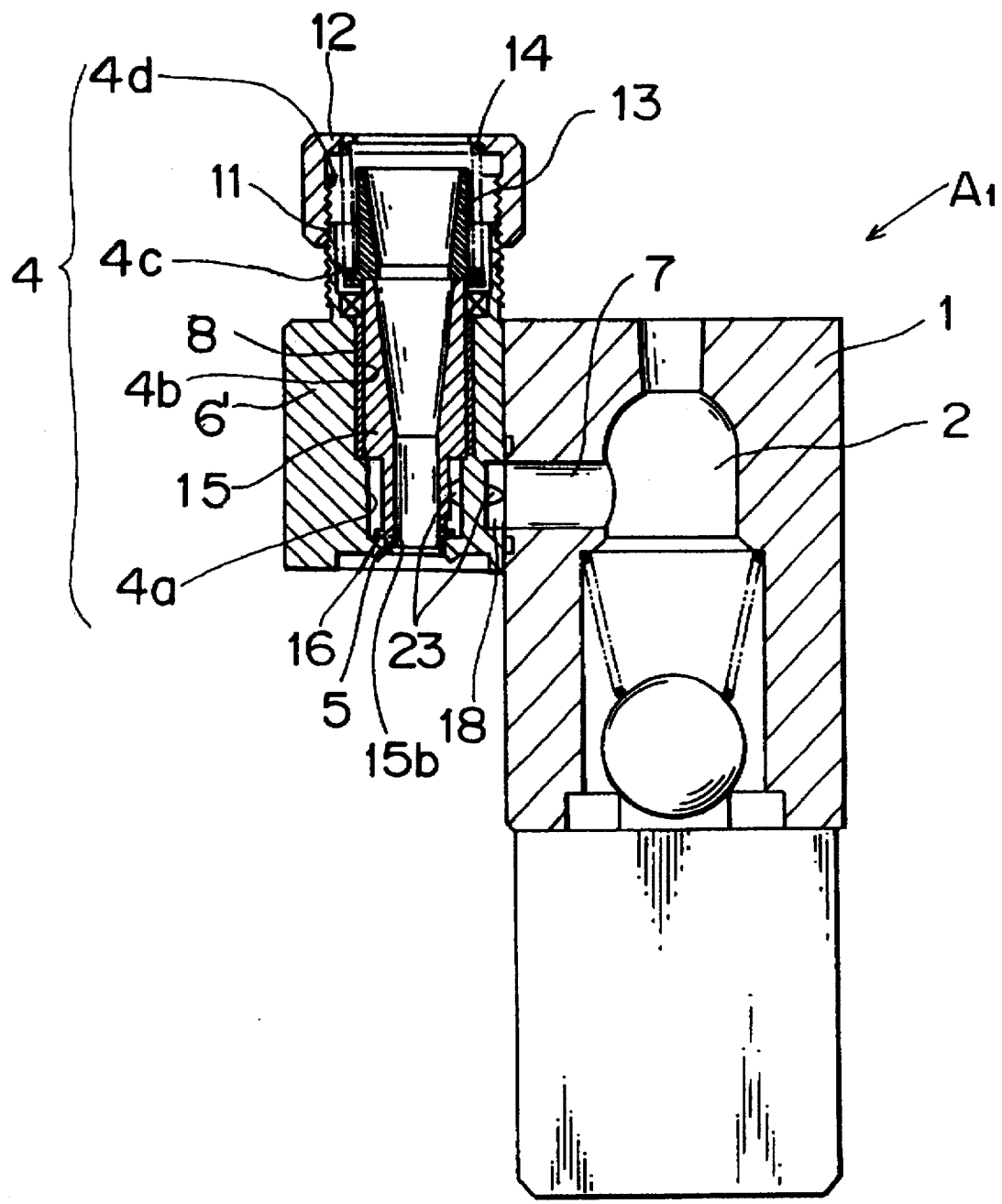
FIG. 1 is a longitudinal sectional view of a working nozzle according to the present invention.
Figure 2:
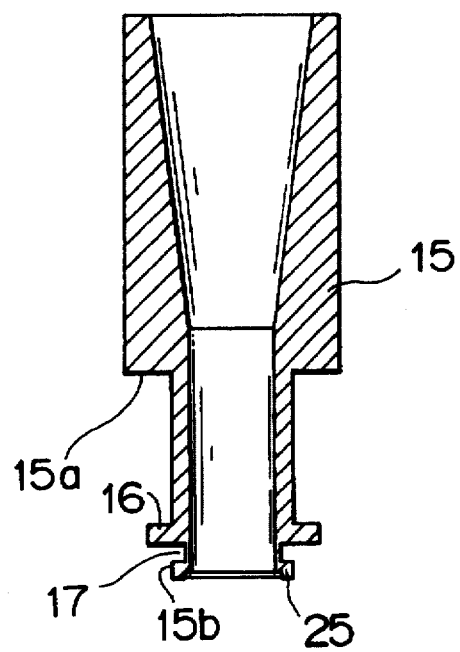
FIG. 2 is a longitudinal sectional view of a nozzle plunger according to the present invention.
Figure 3:
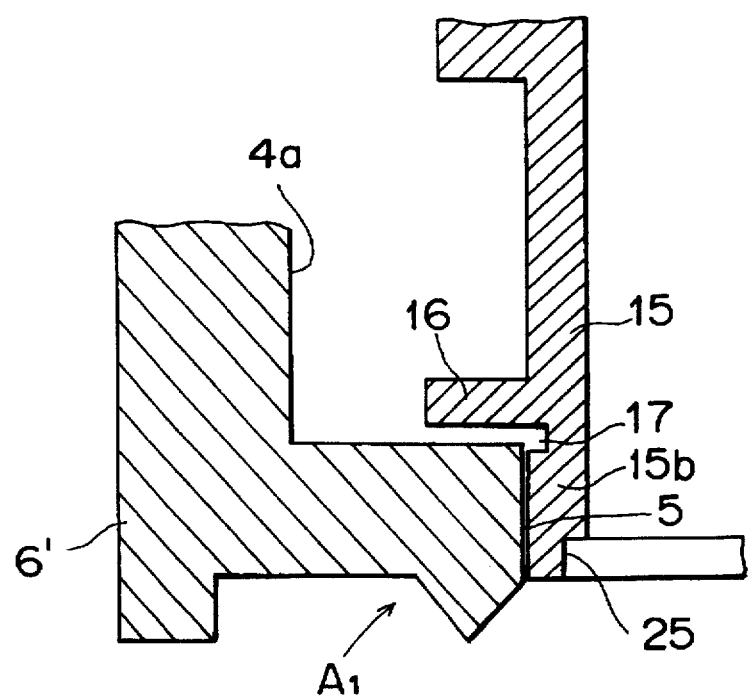
FIG. 3 is a view illustrating the function of a gel accommodating groove provided below the flange of the nozzle plunger.

Referring to the drawings, an explanation will be given of an embodiment of the present invention. FIG. 1 is a longitudinal sectional view of a working nozzle $A_1$ according to the present invention. FIG. 2 is a longitudinal sectional view of a nozzle plunger 15 according to the present invention. FIG. 3 is a view illustrating the function of a gel accommodating groove 17 provided below a flange 16 of the nozzle plunger 15.

The working nozzle $A_1$ according to the present invention is different from the prior art working nozzle A in the form of a cylindrical nozzle plunger.

Therefore, it should be noted that like reference numerals in the explanation of the working nozzle according to the present invention refer to like parts in the prior art working nozzle.

A cylindrical nozzle plunger 15 according to the first embodiment of the present invention has a flange 18 circumferentially provided at the upper end of a valve portion 15b at the lower end (i.e., the flange is located a predetermined distance above the lower end) and a step 25 provided circumferentially at the lower end of the inner periphery of the nozzle plunger 15. The step 25 has a larger diameter than that of the inner diameter of the valve portion 15b of the nozzle plunger 15 (FIG. 2). The cylindrical nozzle plunger 15 is the same as the prior art nozzle plunger 9 in the remaining points.

Figure 5:
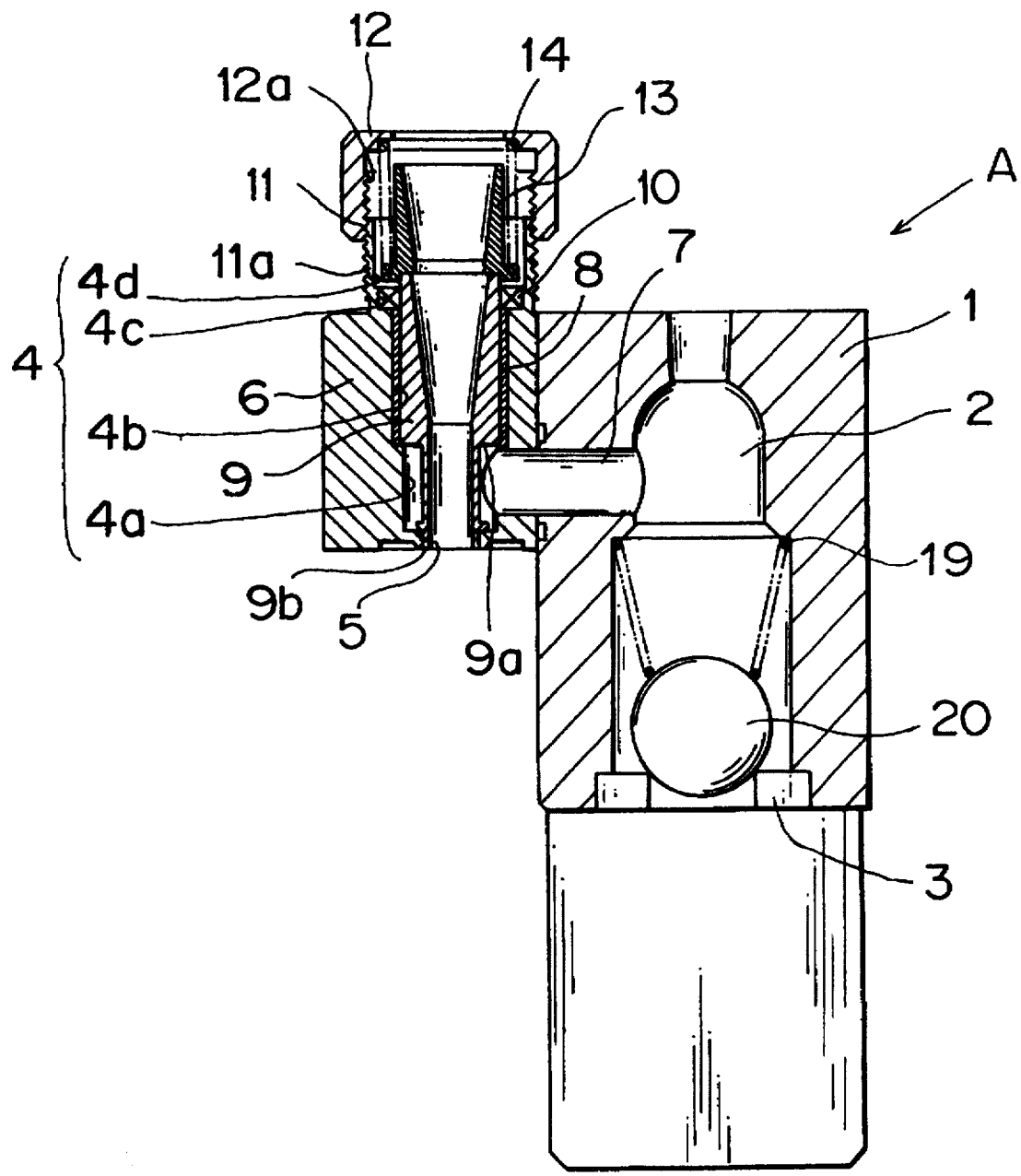
FIG. 5 is a longitudinal sectional view of the prior art working nozzle.
Figure 6:
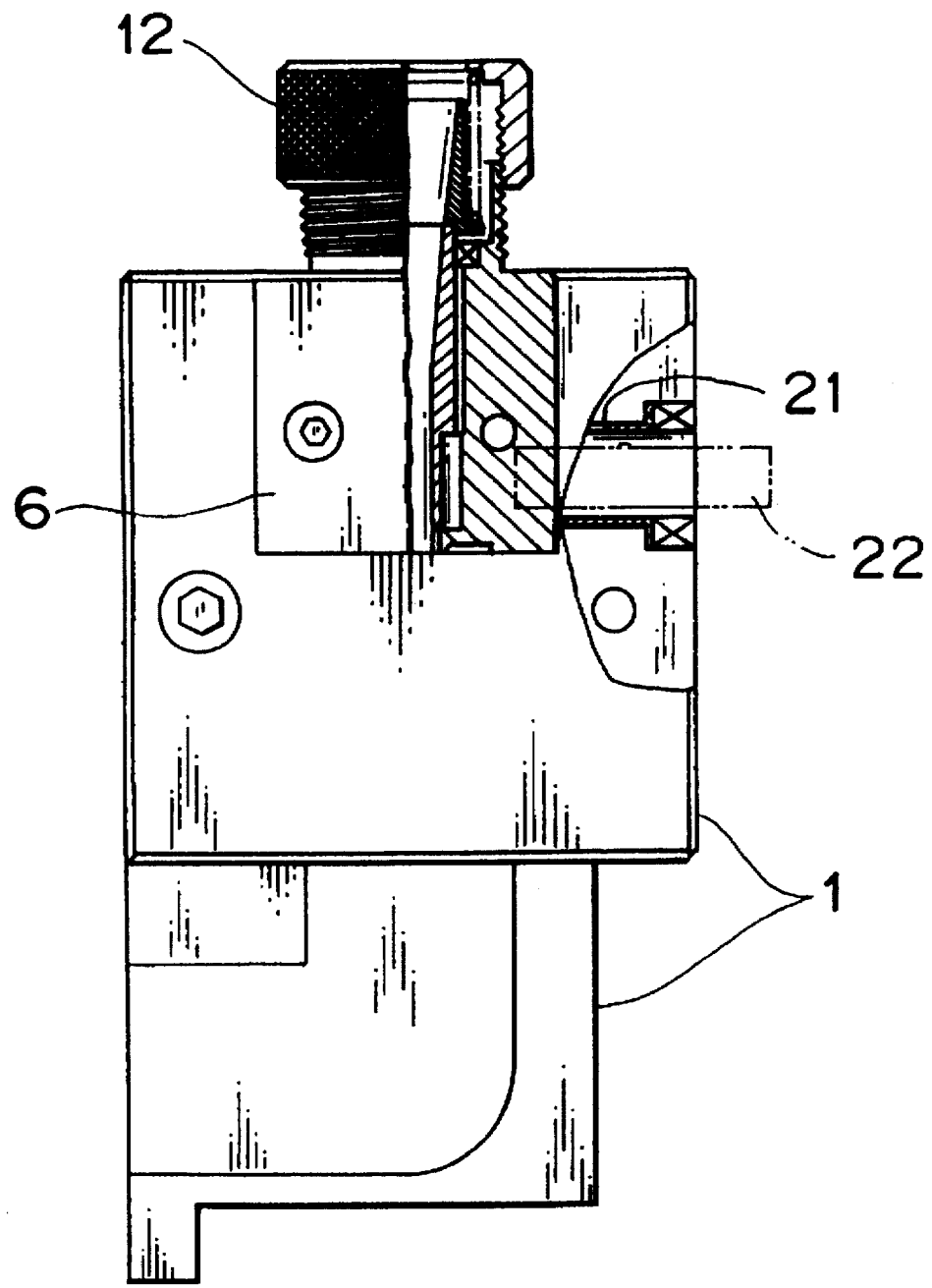
FIG. 6 is a partially exploded front view of FIG. 5.
Figure 7:
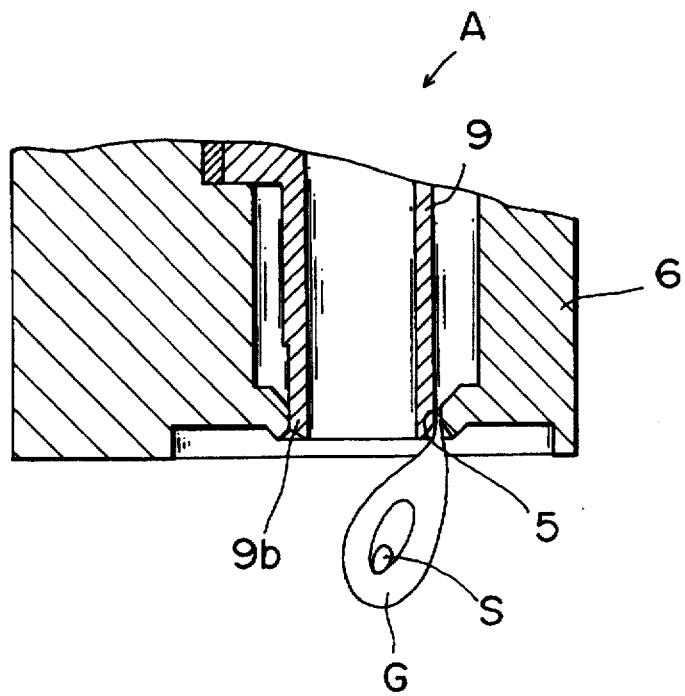
FIG. 7 is a view illustrating instability of gel flow-out in the prior art working nozzle.
Figure 8:
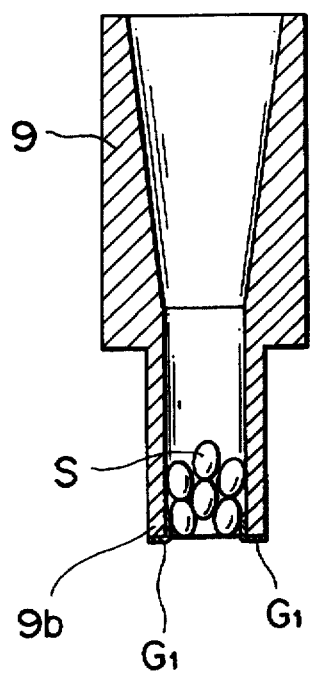
FIG. 8 is a view illustrating stagnancy of seeds.

FIG. 1 shows a nozzle case 6' which is different from the prior art nozzle case 8 shown in FIGS. 5–7 in their type. Differences of the nozzle case 6' from the nozzle case 6 will be explained. The nozzle case 6' has a bottom-equipped gel flow path 18 and gel introducing holes 23 V-shape opened toward the nozzle plunger 15 from the bottom of the gel flow path 18.

The gel introducing holes 23 serve to apply gel pressure to the outer periphery of the nozzle plunger 15.

In putting the present invention into practice, the nozzle case 8 can be used in place of the nozzle case 6'. The remaining components of the nozzle case 6' are the same as those of the nozzle case 6.

An explanation will be given for the operation of the working nozzle $A_1$ in the seed gel-coating apparatus thus structured.

When the valve portion of 15b of the nozzle plunger 15 is inserted into the small-diameter hole portion 5 so as to shut the valve, the flange 18 at the upper end of the valve portion 15b shuts the upper edge of the small-diameter hole portion 5 so that leakage of gel can be surely stopped even when the gap between the valve portion 15b and the small-diameter hole portion 5 is relatively large (see FIGS. 1 and 3).

When pressurized gel flow toward the outer periphery of the nozzle plunger 15 flows through the gel introducing holes 23, the gel pushes the pressure-receiving surface 15a of the nozzle plunger 15. As a result, the nozzle plunger 15 rises against the spring 14. When the nozzle plunger 15 rises, the flange leaves from the upper edge of the small-diameter hole portion 5, and subsequently the valve portion 15b leaves from the small-diameter hole portion 5 to open the valve.

As a result of valve opening, the gel flows out from the entire circumference of the lower end of the small-diameter hole portion 5 to form a gel film G applied to the entire circumference.

Figure 4:
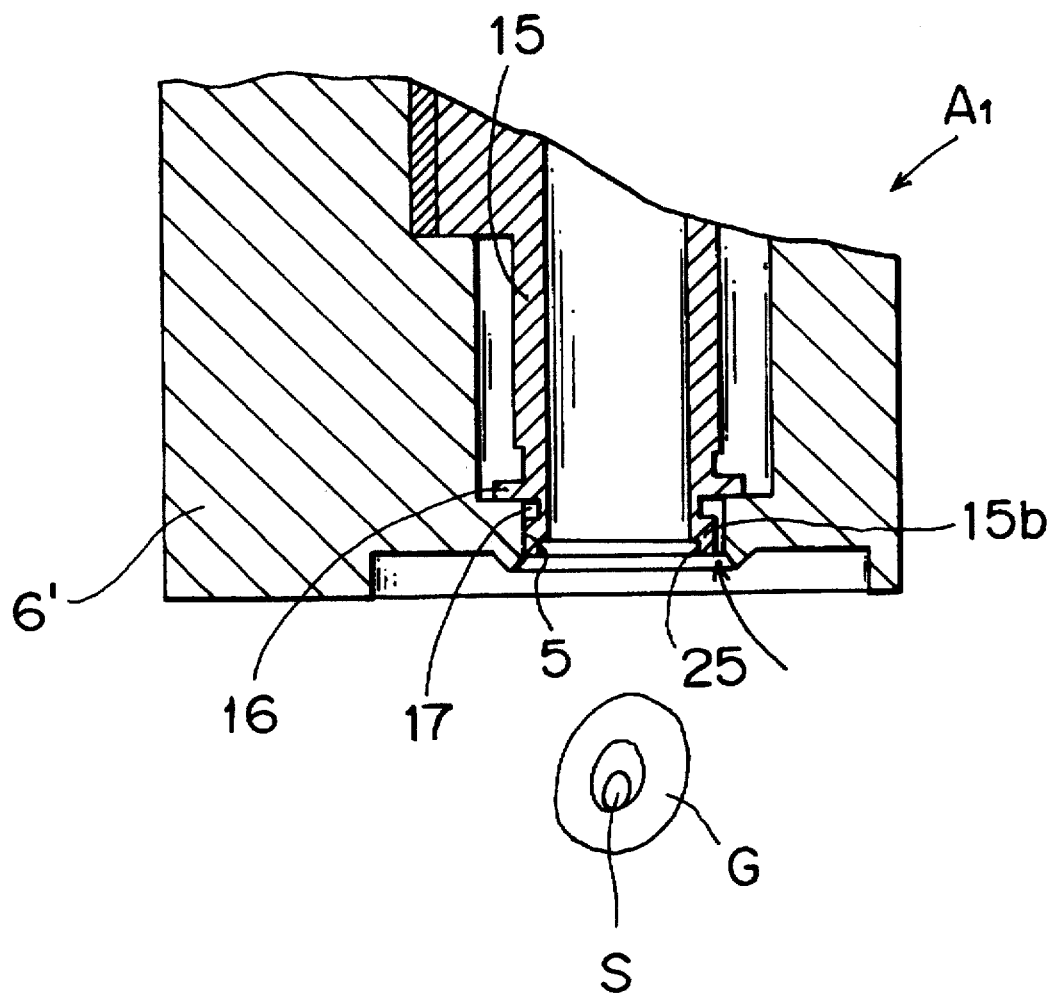
FIG. 4 is a schematic view illustrating gel coating of a seed.

The gel film G thus formed dangles because of its own weight, and wraps the a seed dropped on the film. The gel flowed out as a result of further valve opening covers the upper portion of the seed S. Finally, the gel film G with increased weight drops (FIG. 4).

As described above, the flange 18 can serve to prevent gel from being leaked during valve shutting even when the gap between the valve portion 15b of the nozzle plunger 15 and the small-diameter hole portion 5 is relatively large. But, the gel sandwiched between the flange 16 and the edge of the small-diameter hole portion 5 delays the operation of the flange 18 brought into contact with the upper edge of the small-diameter hole portion 5. This deteriorates the sharp cutting of gel during valve shutting.

Meanwhile, while the nozzle plunger 15 is fabricated, a fillet having the same roundness as the contour of the blade of the cutting tool of a lathe is formed at the corner where the lower surface of the flange 18 and the outer peripheral surface of the valve portion 15b cross. In view of this fact, in order to make flat the entire region of the lower surface of the flange 16, in accordance with the present invention, a relief groove 17 for the blade adjoining to the lower surface of the flange 16 was provided in the outer periphery of the valve portion 15b. As a result, the lower surface of the flange 16 was made flat. In addition, the operation of the flange 16 being brought into contact with the small-diameter hole portion 5 is not delayed and the gel could be sharply cut when the valve shuts.

The reason why the gel was sharply cut when the valve was shut is probably that the relief groove for the blade serves as a gel accommodating groove of gel sandwiched between the flange 18 and the edge of the small-diameter hole portion 5.

Thus, utilizing the advantage that the flange 16 smoothly brings into contact with the upper edge of the small-diameter hole portion 5 without being subjected to resistance of the gel and stops the gel from flowing out, the delay of the operation of the flange 16 being brought into contact with the small-diameter hole portion 5 could be prevented.

As the case may be, while the working nozzle $A_1$ is operated for a long time, a part of the gel flowed owing to valve opening by the nozzle plunger 15 may be applied to the lower end of the nozzle plunger 15 and further extends to the inside of the step 25 of the nozzle plunger 9.

But, since the step 25 does not internally protrude from the inner periphery of the nozzle plunger 15, the dropping seed will not be applied to the gel applied to the step 25. Thus, the conventional problem of stagnancy of seeds within the nozzle plunger was solved.

What is claimed is:

1. A working nozzle for a gel coating apparatus comprising:

a valve case including a gel chamber for accommodating gel;

a nozzle case having a plunger insertion hole which penetrates vertically and has a small diameter hole portion formed at a lower end;

a cylindrical nozzle plunger to be inserted in said plunger insertion hole;

a gel flow path communicating said gel chamber with said plunger insertion hole; and said cylindrical nozzle plunger comprising a valve portion, located at a lower end, for opening or shutting said small-diameter hole portion, and a flange which is located above said lower end and can be brought into contact with or separated from an edge of said small-diameter hole portion, wherein said nozzle plunger has a step provided at the lower end of its inner periphery and having a larger diameter than the inner diameter of said valve portion.

2. A working nozzle according to claim 1, wherein said nozzle plunger has a relief groove provided on the outer periphery of said valve portion and adjoining to a lower surface of said flange, said relief groove serving to accommodate gel.

3. A working nozzle according to claim 1, wherein said flange is located above said lower end of said cylindrical nozzle plunger by a predetermined distance.

* * * * *